United States Patent
Hu et al.

(10) Patent No.: US 8,924,456 B2
(45) Date of Patent: Dec. 30, 2014

(54) METHOD AND SYSTEM FOR PROCESSING ONLINE JOINT GUARANTEE

(75) Inventors: Xiaoming Hu, Hangzhou (CN); Jing Gao, Hangzhou (CN); Feng Li, Hangzhou (CN); Jinbo Xia, Hangzhou (CN); Yanmin Xu, Hangzhou (CN); Weiyan Lv, Hangzhou (CN); Lijiang Zhang, Hangzhou (CN); Zhengwei Zhang, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 326 days.

(21) Appl. No.: 12/298,247

(22) PCT Filed: Oct. 22, 2008

(86) PCT No.: PCT/US2008/080797
§ 371 (c)(1),
(2), (4) Date: Mar. 6, 2009

(87) PCT Pub. No.: WO2009/055476
PCT Pub. Date: Apr. 30, 2009

(65) Prior Publication Data
US 2011/0219054 A1 Sep. 8, 2011

(30) Foreign Application Priority Data
Oct. 25, 2007 (CN) .......................... 2007 1 0163448

(51) Int. Cl.
*G06F 15/16* (2006.01)
*G06Q 40/02* (2012.01)

(52) U.S. Cl.
CPC ..................... *G06Q 40/02* (2013.01)
USPC ............ 709/200; 709/202; 709/203; 709/224

(58) Field of Classification Search
USPC .................................. 709/202, 203, 224, 200
See application file for complete search history.

(56) References Cited

U.S. PATENT DOCUMENTS

| 2002/0082882 A1 | 6/2002 | Perry et al. |
| 2002/0138415 A1 | 9/2002 | Siska |

(Continued)

FOREIGN PATENT DOCUMENTS

| CN | 1716305 A | 1/2003 |
| CN | 1940988 A | 4/2007 |

(Continued)

OTHER PUBLICATIONS

The Japanese Office Action mailed Jul. 19, 2013 for Japanese patent application No. 2010-531204, a counterpart foreign application of U.S. Appl. No. 12/298,247, 2 pages.

(Continued)

*Primary Examiner* — Lan-Dai T Truong
(74) *Attorney, Agent, or Firm* — Lee & Hayes, PLLC

(57) ABSTRACT

A method and a system are disclosed for processing online joint guarantee. After a server receives an application from a user, the server provides various types of joint guarantee grouping to the user for selection. The server creates a joint guarantee group having a unique ID according to the selection of the user, organizes the information of the joint guarantee group into a data packet and sends the data packet to a bank system to be approved. The method potentially improves the success rate of joint guarantee grouping and removes the geographical limitations. Through the Internet, the method makes it possible to join companies of different geographical locations for online joint guarantee. The method also establishes a complete online alert mechanism, and realizes computerized loan risk control to improve the business credit system.

19 Claims, 8 Drawing Sheets

(56) References Cited

U.S. PATENT DOCUMENTS

| | | | |
|---|---|---|---|
| 2003/0097331 A1 | 5/2003 | Cohen | |
| 2005/0262000 A1 | 11/2005 | Sato | |
| 2006/0178976 A1 | 8/2006 | Vu | |
| 2007/0061248 A1 | 3/2007 | Shavit et al. | |
| 2007/0067229 A1* | 3/2007 | Parthasarathy | 705/35 |
| 2007/0198401 A1* | 8/2007 | Kunz | 705/38 |
| 2008/0040259 A1 | 2/2008 | Snow et al. | |
| 2008/0201246 A1* | 8/2008 | Casey et al. | 705/30 |
| 2009/0030832 A1 | 1/2009 | Chien | |
| 2009/0276305 A1 | 11/2009 | Clopp | |
| 2010/0274740 A1 | 10/2010 | Lambe | |
| 2010/0287092 A1* | 11/2010 | Colman et al. | 705/38 |
| 2011/0087569 A1* | 4/2011 | Bidabad et al. | 705/30 |
| 2012/0030093 A1* | 2/2012 | Farias | 705/38 |

FOREIGN PATENT DOCUMENTS

| | | |
|---|---|---|
| JP | 2003242350 | 9/2003 |
| JP | 2004094772 | 3/2004 |
| JP | 2006079493 | 3/2006 |
| JP | 2007140668 | 6/2007 |

OTHER PUBLICATIONS

The Extended European Search Report mailed Aug. 12, 2011 for European patent application No. 08841650.8, 6 pages.

"Case Studies of Business Related Inventions that are not to Patent", Apr. 2010, retrieved May 16, 2013 at http://www.jpo.go.jp/tetuzuki/t_tokkyo/bijinesu/tt1303-090_jirei.htm, 22 pgs.

The Japanese Office Action mailed Mar. 15, 2013 for Japanese patent application No. 2010-531204, a counterpart foreign application of U.S. Appl. No. 12/298,247, 9 pages.

"Recent Trends in Business Related Invention", retrieved May 16, 2013 at http://www.jpo.go.jp/tetuzuki/t_tokkyo/bijinesu/biz_pat.htm, 5 pgs.

The Chinese Office Action mailed Jan. 18, 2011 for Chinese patent application No. 200710163448.5, a counterpart foreign application of U.S. Appl. No. 12/298,247, 3 pages.

\* cited by examiner

METHOD AND SYSTEM FOR PROCESSING ONLINE JOINT GUARANTEE

RELATED APPLICATIONS

The present application claims priority benefit of Chinese patent application No. 200710163448.5, filed Oct. 25, 2007, entitled "METHOD AND SYSTEM FOR PROCESSING ONLINE JOINT GUARANTEE", which Chinese application is hereby incorporated in its entirety by reference.

BACKGROUND

The present disclosure relates to the fields of e-commerce, and particularly to methods and systems for processing online joint guarantees.

One of the biggest bottlenecks for small/medium-sized companies is a shortage of funds and difficulties to find a guarantor for taking a loan from a bank. Joint guarantee is an attempt to solve this problem. Conventional joint guarantee refers to three or more than three small/medium-sized companies voluntarily joining together as a guarantee body (i.e., a joint guarantee group) and jointly apply for a loan from a bank through internal communication and coordination among the companies. When a member of the joint guarantee group applies for a specific credit from the bank, other members of the joint guarantee group provide a joint guarantee for the credit of the applicant's bank. The loan applicant also bears unlimited individual unlimited liability. The initiation and forming of the conventional joint guarantee groups are completely offline. The risk control of the conventional joint guarantee has the following mechanism: (1) the joint guarantee group communicates directly with the bank without involvement of any other institutions; and (2) monitoring is performed by lending officers and is dependent on their visits. Currently, the information of companies' loan conditions can be exchanged and obtained among the banks For example, a bank can query the loan record of a company through a loan card of the company. However, in the conventional joint guarantee model, the loan and credit records of the companies are restricted to inter-bank communications only.

There are several deficiencies of the conventional joint guarantee.

(1) Only one type of joint guarantee grouping is available. Conventional joint guarantee is completely offline and substantially restricted to the same or nearby geographical locations. The method depends on a bank to make a match among the companies and therefore suffers a greatly reduced success rate and a limited number of successes for grouping.

(2) Incomplete monitoring mechanism. The conventional method uses only one type of monitoring mechanism, namely monitoring by means of on-site inspection of the bank, resulting in an incompetent risk control mechanism.

(3) The loan records are used only among the banks and such records have no clear benefit to the company's credit establishment.

SUMMARY OF THE INVENTION

Disclosed is a method and a system of processing online joint guarantee that allow a user to choose online from various ways to form a joint guarantee group. The method aims to build a complete set of monitoring system. During a loan application and loan utilization by a company, the disclosed system can monitor and alert for the behaviors of the company over the Internet.

One aspect of the present disclosure is a method for processing online joint guarantee. After a server receives an application from a user, the server provides various user selectable types of joint guarantee grouping. The server creates a joint guarantee group having a unique ID according to a selection made by the user, organizes the information of the joint guarantee group into a data packet and sends the data packet to a bank system for further processing.

In one embodiment, the server determines if the user satisfies the requirements of the application after receiving an application from a user. If the user does, the server provides the various types of joint guarantee grouping to the user for selection. Otherwise, the server saves the information of the user application into a database.

In another embodiment, after the server organizes the information of the joint guarantee group into a data packet and sends the data packet to a bank system, the server receives a feedback from the bank system indicating whether the user application is successful, and notifies the user of the feedback.

In one embodiment, the server generates a unique joint guarantee ID according to the selection of the user and binds the information of the joint guarantee group with the member information of the user. Based on the member information, the server determines whether the user satisfies the grouping requirements. If yes, the server creates the joint guarantee group.

The types of joint guarantee grouping may include any one or a combination of automatic matching, fraternity, and online initiation/participation. An example of automatic matching of joint guarantee grouping is performed based on preset criteria of the user who first fills in the information of the application. The server automatically recommends other users relevant to the business information of the application to the user, provides reciprocal data of users, and suggests forming a joint guarantee group among the users.

An example of fraternity grouping has multiple users form a fraternity and agree to initiate a joint guarantee group. One of the users of the fraternity creates the joint guarantee group and adds the other users of the fraternity to jointly apply for loan business.

An example of online initiation/participation of joint guarantee grouping has a user with business needs publish a grouping request on the server, indicate the user's own qualifications and grouping criteria, and wait for and/or add qualified users to form the group.

Another aspect of the present disclosure is a server which has a processing module, a grouping module, and a sending module. The processing module is adapted for receiving an application from a user, providing various types of joint guarantee grouping for user selection, and sending the user selection to the grouping module. The grouping module is adapted for creating a joint guarantee group with a unique ID according to the user selection, and sending the information of the joint guarantee group to the sending module. The sending module is adapted for receiving the information of the joint guarantee group from the grouping module, organizing the information of the joint guarantee into a data packet, and sending out the data packet.

In one embodiment, the server further has a determination module adapted for receiving application information of the user and determining whether the user satisfies requirements of the application. If the user does, the determination module sends the application information of the user to the processing module. Otherwise, the determination module sends the application information of the user to a storage module.

The server may also include a storage module adapted for storing the application information of the user if the user does not satisfy the requirements of the application.

The server may further have a receiving module and a notifying module. The receiver module is adapted for receiving a message indicating whether the application of the user is approved, and for sending the message to the notifying module. The notifying module is adapted for sending the message the user.

Compared with the existing technologies, the method and system disclosed herein may have several advantages. Using the disclosed method, one can improve the success rate of joint guarantee grouping and remove the geographical limitations. Through Internet, the method makes it possible to form joint guarantee groups from companies of different geographical locations. The method is also capable to establish a complete set of online alert mechanism, thereby achieving computerized risk control of the loans and improves the business credit system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF DRAWINGS

The detailed description is described with reference to the accompanying figures.

DETAILED DESCRIPTION

Online joint guarantee is a new type of financing risk control method based on Internet e-commerce applications to address the problem of loan guarantees for the small/medium-sized companies. Online joint guarantee is founded on business-to-business (B2B) Internet e-commerce applications. It is a loan contract backed by a joint guarantee of a joint guarantee group created in connection to Internet e-commerce and offline businesses, and conducts risk control among the companies of the joint guarantee group. Members of the joint guarantee group accept risk monitoring and control of banks and e-commerce platforms, and allow the dynamic states of the joint guarantee to be directly reflected on the Internet, making it possible to control the entire loan process.

Disclosed herein is a new method and system for processing online joint guarantee. The method provides a veritable user selectable ways of joint guarantee grouping and uses a server to centrally manage the entire loan process, including forming joint guarantee groups (i.e., grouping) and loan approval. The loan records of participating companies are also effectively connected to the credit history of the companies. The method and system will be described in further details using figures and exemplary embodiments as follows.

Figure 1:
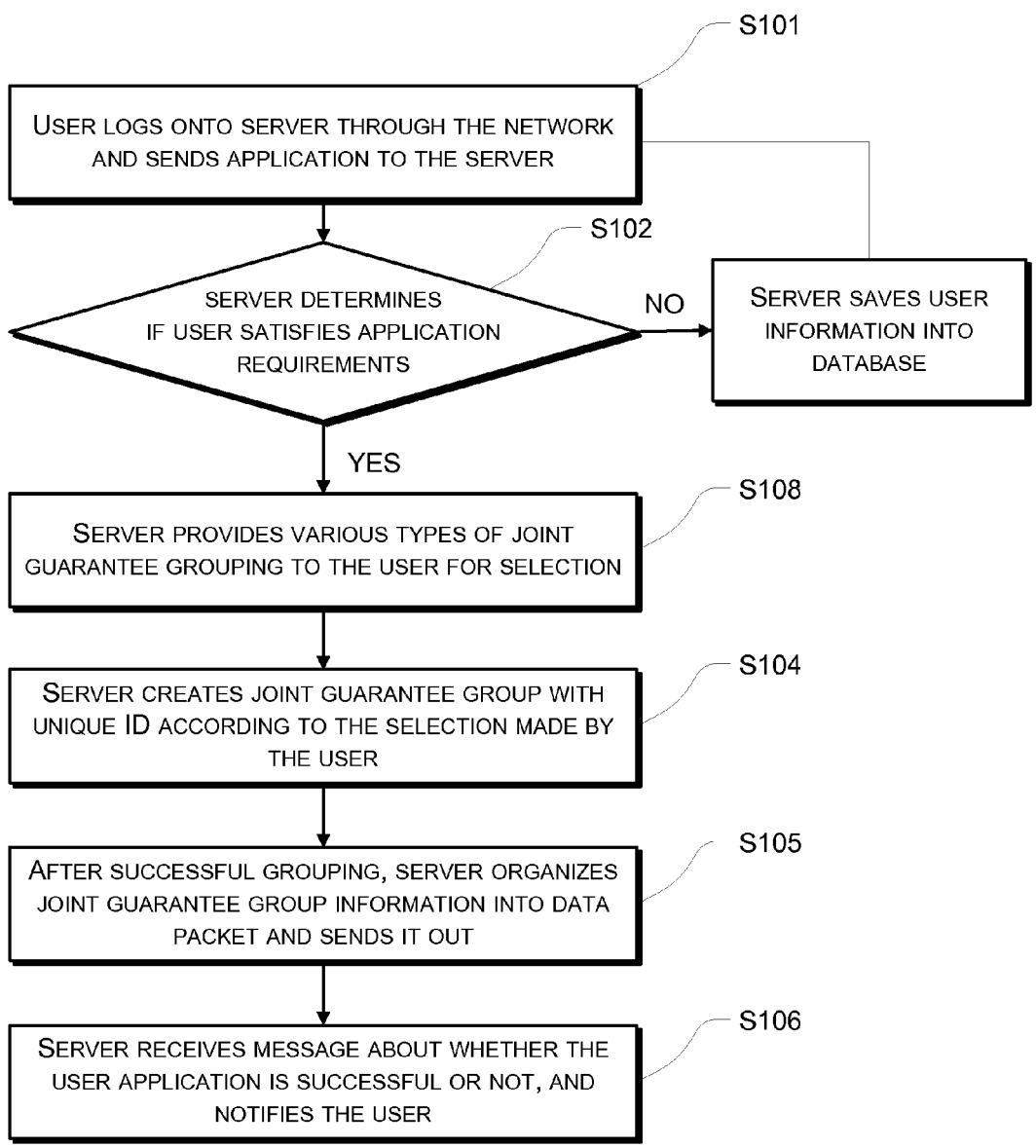
FIG. 1 shows a flow chart of a first exemplary method for processing online joint guarantee in accordance with the present invention.

FIG. 1 shows a flow chart of a first exemplary method for processing online joint guarantee in accordance with the present invention. In this description, the order in which a process is described is not intended to be construed as a limitation, and any number of the described process blocks may be combined in any order to implement the method, or an alternate method.

At block S101, a user logs onto a server through a network and submits to the server an application or request for forming or joining a joint guarantee group.

At block S102, after receiving the application of the user, the server determines whether the user satisfies application requirements. If the user does, the process continues to block S103. Otherwise, the server saves the information of the user into a database.

At block S103, the server provides various user selectable types of joint guarantee grouping. In one embodiment, the server provides the various user selectable types of joint guarantee grouping directly to the user for user selection.

Examples of the various types of joint guarantee grouping include automatic matching, fraternity, online initiation/participation, or a combination thereof At block S104, the server creates a joint guarantee group having a unique ID according to the selection made by the user.

At block S105, after successfully creating the joint guarantee group, the server organizes the information of the joint guarantee group into a data packet, saves the data packet into the database, and sends the data packet to a bank system through the Internet for further processing.

At block S106, the server receives a feedback from the bank system indicating whether the user application is approved, and notifies the user of the feedback.

The method of the present disclosure is described in further details using the following exemplary embodiment involving a loan application of a company submitted to a bank system through a server. Because in the illustrated embodiments, the method is applied to companies as users, the terms "company" and "user" and their plural forms are used interchangeably unless noted otherwise.

Figure 2:
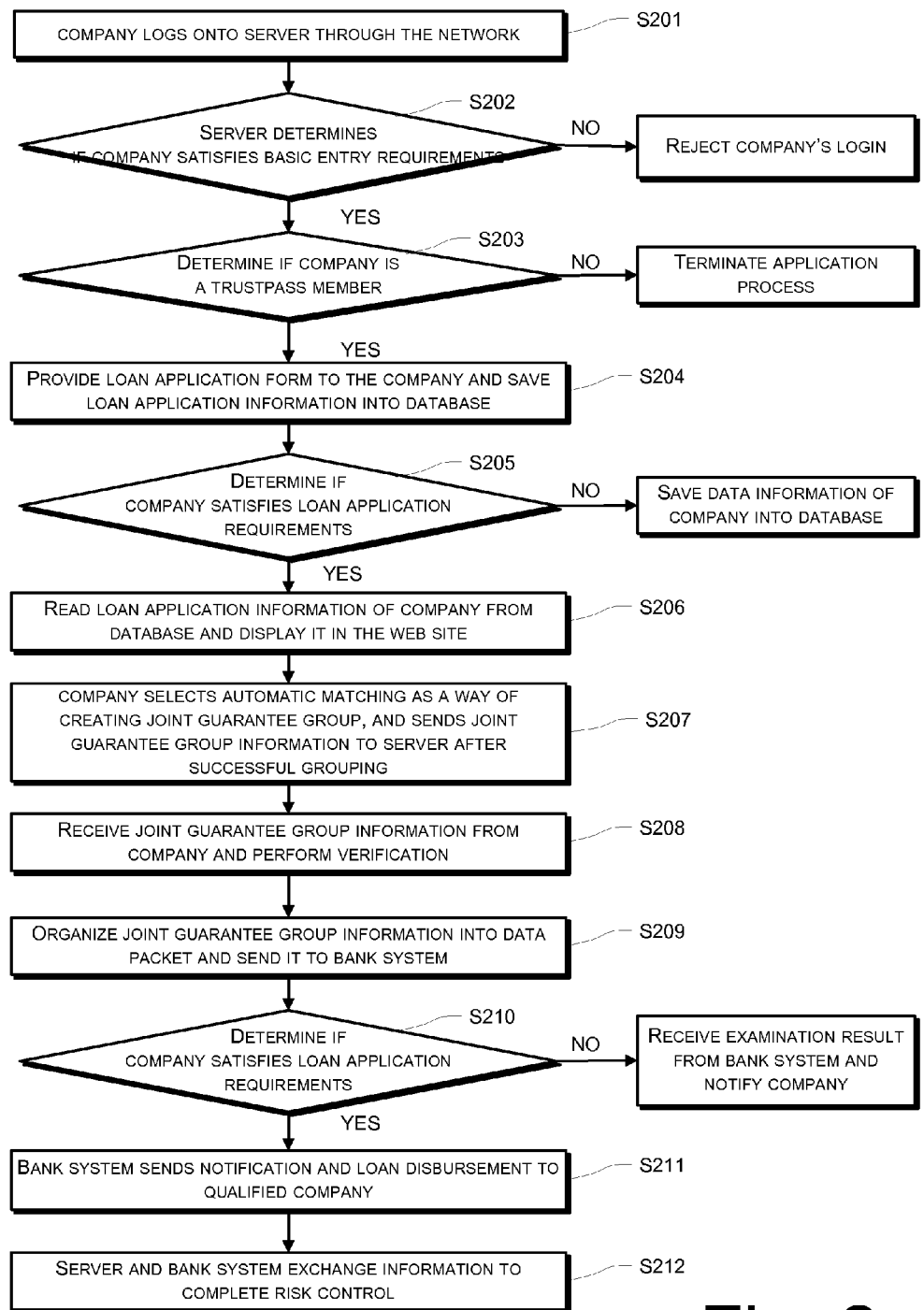
FIG. 2 shows a flow chart of a second exemplary method for processing online joint guarantee in accordance with the present invention.

FIG. 2 shows a flow chart of a second exemplary method for processing online joint guarantee in accordance with the present invention. In the second exemplary embodiment, automatic matching is used as an exemplary type of joint guarantee grouping to illustrate the method for processing online joint guarantee. In the following, blocks S201 to S207 is referred to as the grouping process.

At block S201, a company (user) logs onto a server through the Internet.

At block S202, the server determines whether the company satisfies the basic requirements for entry. If yes, the process continues to block S203. Otherwise, the server rejects the login of the company.

For example, during the login of the company, the server determines whether the company satisfies the basic requirements for entry by searching information of the company in a database (DBA). The basic entrance requirements may include the company's login zone, identity, industry, company size, etc. Depending on different conditions, these basic requirements can be timely adjusted by the server.

At block S203, after the company has successfully logged in, the server determines whether the company is a member of a privileged group or club by searching the information of the company. One example of such a privileged club is TrustPass. A TrustPass member is a paying club member of the website of Alibaba.com. To become a TrustPass member, the entity is required to pass a special identity authentication. If the company is a privileged group (e.g., a TrustPass member), the process continues to block S204. Otherwise, the process terminates. Alternatively, a new process may be started to either offer a different type of loan application to the company or to invite the company to join the privileged group.

At block 204, the server provides a loan application form to the company to be filled, and saves the information of the loan application filled by the company into the database.

For example, as the company fills in the loan application form, the server automatically calls the member information of the company in the database. The member information is configured by the server and is not modifiable by the company. After the company has submitted the loan application form, the server saves the loan application information filled in by the company into the database, and generates a unique application form serial number in the database. The server then binds this unique application form serial number with the member information of the company.

At block S205, the server determines if the company satisfies the requirements of loan application based on the loan application information of the company. If the company does, the process continues to block S206. Otherwise, the server saves the data of the company into the database for a potential later reuse (e.g., when the company is able to satisfy the loan application requirements).

In one embodiment, for example, the company is required to satisfy the following three requirements of loan application: (1) the company is a TrustPass member; (2) the company has been registered as a legitimate business for at least eighteen months; and (3) there is no record of a complaint filed against the company.

If the server determines that the company is a TrustPass member, the server provides the loan application form to the company. Based on the information of loan application filled in by the company, the server determines if the company satisfies the above second and third loan application requirements. If it does, the application is successful. Otherwise, the application of the company fails and the server saves the data of the company into the database for a potential later reuse (e.g., at a time when the company is able to satisfy the loan application requirements).

For example, the application may be rejected if the company is found to be under a fraud investigation, and the ID of the company may be canceled if the fraud is verified; or the application is rejected if the company has received two or more complaints in the past six months.

At block 206, the server reads the loan application information of the company stored in the database and displays the information on a website.

Specifically, the server creates a categorical display list, reads the loan application information of the company (e.g., the company's regional location, company's name, size, etc) stored in the database, and displays the information on the website correspondingly. The company or other members can search the loan application information of the company through a keyword search. The keyword search may include two search types—namely a fuzzy inquiry and an exact inquiry. When the company or other company users (members) conduct a categorized search, the server can read the application information and part of the member information. When more detailed information is required, the server can bind and display the information of the loan application on the website in a detailed form.

After the application of the company has succeeded, banks and other company users (members) can read the information of the company on the website in the format as shown in the following TABLE:

TABLE

| Sequence Number | Title | Required | Filled by User/System | Category |
|---|---|---|---|---|
| 1 | User Login ID | Yes | System | Basic Information |
| 2 | Registration Time | Yes | System | Basic Information |
| 3 | Company Name | Yes | System | Basic Information |
| 4 | Company Address | Yes | User | Basic Information |
| 5 | Registered Capital (RMB/USD) | Yes | System | Financial Information |
| 6 | Financial Index (Multiple Fillable Options) | Yes | User | Financial Information |
| 7 | Loan Demand (Amount) | Yes | User | Loan Information |
| 8 | When is the Loan Needed | Yes | User | Loan Information |
| 9 | Collaterals (Name, Value) | Yes | User | Loan Information |
| 10 | Industry Information (such as Products) | Yes | User | Basic Information |
| 11 | Number of Employees | Yes | User | Basic Information |
| 12 | Size of Factory | Yes | User | Basic Information |
| 13 | Buyer Information | Yes | User | Basic Information |

TABLE-continued

| Sequence Number | Title | Required | Filled by User/System | Category |
|---|---|---|---|---|
| 14 | Company Brand | Yes | User | Basic Information |
| 15 | Opening Bank | Yes | User | Financial Information |
| 16 | Loan Card Number | No | User | Financial Information |
| 17 | Certificate | No | User | Basic Information |
| 18 | Level of Activity | No | System | Online Information |
| 19 | Water and Energy Consumptions | No | User | Basic Information |
| 20 | Number of Orders | No | System | Online Information |
| 21 | Number of Successful Orders | No | System | Online Information |
| 22 | Number of Business Partners | No | System | Online Information |

At block 207, the company selects automatic matching to create a joint guarantee group and sends the information of the joint guarantee group to the server after successfully creating the joint guarantee group.

Automatic matching is one of the user selectable types of joint guarantee grouping. An exemplary automatic matching has the server automatically recommends other matching companies to the company after the company has filled in the information for the loan application. The other matching companies are loan-applying companies of similar condition. The server's automatically recommendation is based on the preset criteria of the company. The server recommends that the matched companies provide their data to one another, and advises forming a joint guarantee group among the companies.

In one example, after the application of the company has succeeded, the server determines whether the company has selected automatic matching of joint guarantee grouping. If the company has selected automatic matching of joint guarantee grouping, the server then determines if the company satisfies the requirements for creating a joint guarantee group. The requirements for creating joint guarantee group may be the same types as the basic entrance requirements of company login, but at different levels. The requirements can be timely adjusted by the server based on various conditions. If the company satisfies the requirements for creating joint guarantee group, the server creates a joint guarantee group for the company, and searches the database for information of other companies that satisfy the matching requirements of the company. The server then recommend companies of similar conditions and advise them to form a joint guarantee group. Each time the server makes a recommendation to the company, the server notifies the relevant companies through instant or real-time notification. If the company does not choose automatic matching for joint guarantee grouping, the server may perform other types of joint guarantee grouping.

The server may provide multiple joint guarantee groups that satisfy the company's requirements to the company for selection. The company can select any one of the joint guarantee groups provided by the server and apply for grouping. For example, the server may provide groups that include companies in a certain region, groups that include companies of same kind of business, groups that include companies of similar company size, or groups that include companies of similar loan demand. If the server cannot find any company satisfying the requirements, the server may send a notification message to the company and ask the company to change its loan application demands or to wait.

The joint guarantee group created by the server for the company has a unique joint guarantee group ID. The server binds the member information of the company with the information of the created joint guarantee group. After creating the joint guarantee group, the company may find other companies that can be added as members of the group through searching under the requirements, and invite these companies to join the joint guarantee group. As the company adds a new company as member, the server may determine if the new company satisfies the loan requirement by searching information of the member in the database.

In the grouping process, companies in the joint guarantee group may be allowed to add new members. To be added as a member, the new company may be subjected to examination and approval by all current members in the joint guarantee group. If one current member does not consent, the addition of this member may be rejected.

Before the company which is creating the joint guarantee group submits the joint guarantee group information, other companies can withdraw at any time. At this point, the record of a company stored in the database includes the following information: whether the company is a founder of the joint guarantee group, membership ID, application form serial number, joint guarantee group ID and status of the joint guarantee group. An example of the status of the joint guarantee group is whether the group is in the stage of grouping. If the group is in the stage of grouping, other members can withdraw; otherwise, the status information cannot be modified and the companies cannot withdraw from the joint guarantee group.

The above blocks S201 to S207 is considered to constitute a grouping process.

At block S208, the server receives the information of the joint guarantee group from the company and performs verification.

Specifically, the server determines whether the members in the group satisfy the requirements for creating a joint guarantee group. The requirements for creating a joint guarantee group may include: identities and the number of the company members in the group, relevant industries, relationship among the companies and related qualifications of the companies. These requirements can be timely adjusted by the server. If the grouping requirements are satisfied, the server will determine if all companies in the joint guarantee group are mutually accepting and agreeing with one another to bear risks jointly. If so, grouping is successful and the process will continue to block S209. If one or more company in the joint guarantee group raises an objection, grouping fails and the server needs to match again or choose a different type of grouping. The server immediately notifies the company who is creating the joint guarantee group of the determination result as described above, through any suitable means such as in-site message, email, text message or web page.

Reasons to cause a grouping failure may include the following exemplary scenarios. One of the companies in the group disagrees, so the grouping fails and the server deletes the group. Or, one of the companies in the group is being eliminated (e.g., being forced out), therefore the grouping fails but other companies may continue to form the group. If a company is being kicked out from its original group as a result of voting by the members of a candidate joint guarantee group (a joint guarantee group that is being formed), the server may match the company to other candidate companies who are applying for a loan and share similar conditions, and advise these companies to form another joint guarantee group. Alternatively, the consenting or complying companies can create a new joint guarantee group, while the dissenting or non-complying companies remain in the original joint guarantee group.

During the stage of waiting for the joint guarantee group to be created, if it is taking an excessively long time for a candidate joint guarantee group and a loan-applying company to form a group, the server can on its own initiative send to the company a notice to recommend other candidate companies or groups and advise the new companies to form a joint guarantee group.

The server also provides an automatic feedback function. For example, if a company or a candidate joint guarantee group is not satisfied with the current matching result or any other conditions, the company or the candidate joint guarantee group can request using automatic matching to match with candidate joint guarantee groups and candidate companies of similar conditions. The server then returns a feedback carrying a requested result of the automatic matching to the requesting company or companies according to the matching request.

The server further provides a quality recommendation function. For example, the server rates companies which have previously borrowed loans according to the performance of their loan contract obligations, and based on the rating result, recommends with preference those the companies which have withdrawn from joint guarantee group but still have loan demands.

The above block 208 may be referred to as an acceptance process.

At block 209, after verification is passed, the server organizes the joint guarantee group information into a data packet and sends the data packet to a bank system through the network.

Interfaces between the server and the bank system have message sending and message receiving functions. As each message or a status feedback is sent, a response is expected from the opposite system (the server or the bank). If there is no response from the opposite system within the time period of feedback, the message is resent automatically and the status of the message with corresponding ID is obtained through the interface for auto-synchronization.

At block S210, the bank system examines the company according to the information of user loan application sent from the server. The bank system determines if the company satisfies the loan requirements. If the loan requirements are satisfied, the process continues to block S211. Otherwise, loan application fails. The bank system sends to the server an examination result indicating whether the company may receive a loan applied for. Upon receiving the examination result, the server notifies the company. The format of the notification may be an email, text message, etc. If the company receives approval to the loan, the server asks if the company would choose to disclose some of the examination content in the website. If the company chooses to disclose the examination content, the server may increase TrustPass index of the company.

At block 211, the bank system sends a notification message to the company which satisfies the loan requirements, and disburses the loan. As a result, the company which passes the verification receives the loan from the bank and also receives a raise in its TrustPass index by the server.

At block 212, the server and the bank system exchange information through the interfaces and complete risk control of the loan of the company.

Figure 3:
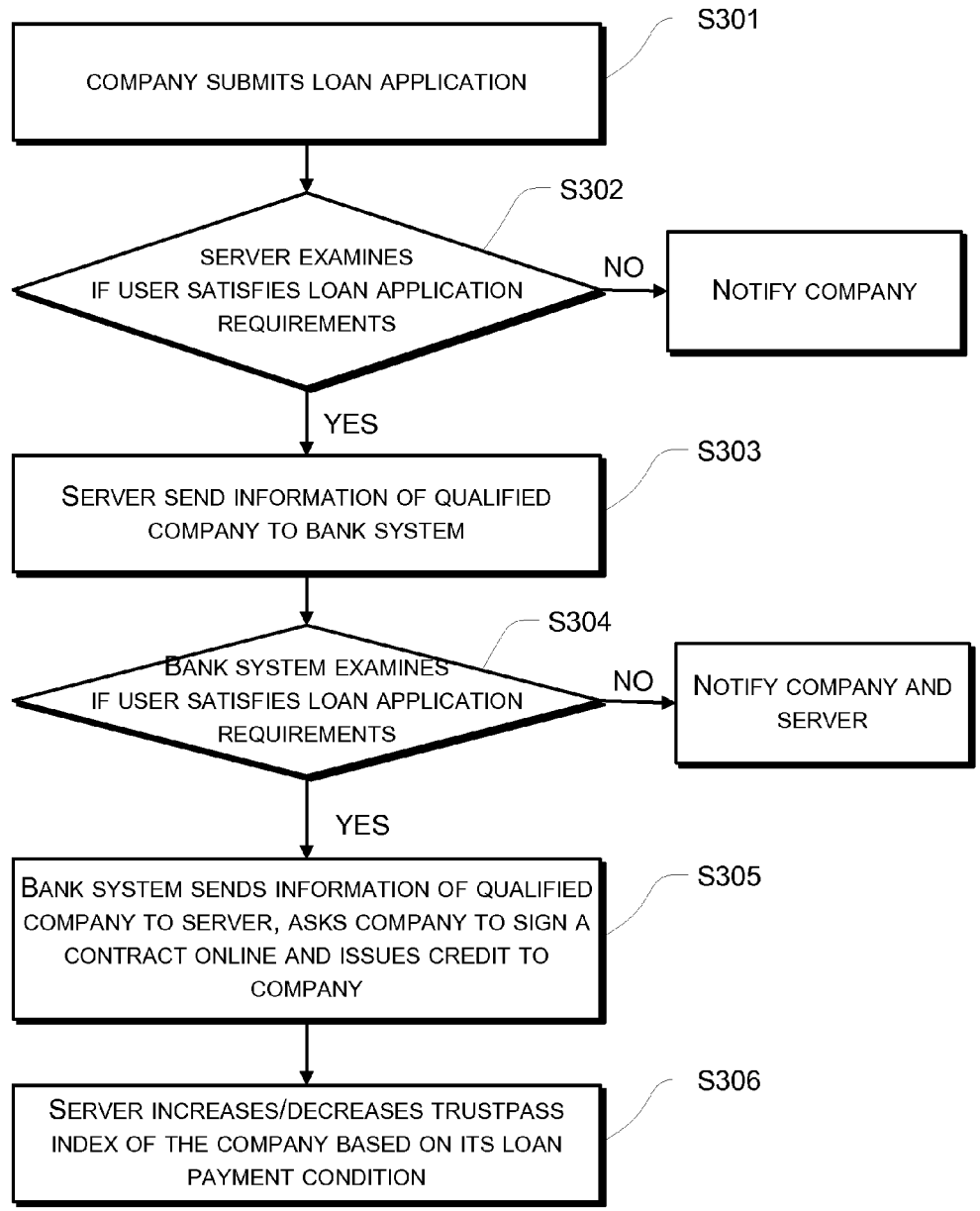
FIG. 3 shows a flow chart of an exemplary information exchange between server and bank system.

FIG. 3 shows a flow chart of an exemplary information exchange between server and bank system. In each stage of the whole loan application process, the server and the bank system exchange information between each other uses such an information exchange process.

At block S301, a company logs onto a server through a network and sends a request of loan application to the server.

At block S302, the server receives information of the loan application submitted by the company and performs preliminary verification (e.g., examining if the company satisfies loan application requirements). If the company satisfies the requirements, the process continues to block S303. If the company fails the verification, the server will notify the company.

At block 303, the server sends to a bank system the information of the company which has passed the verification.

At block 304, after the bank system receives the loan application information of the company from the server, the bank system examines whether the company satisfies the loan application requirements. If satisfied, the process continues to block S305. The bank system also sends to the server the information of the company if the company has failed to pass the verification, and notifies both the company and the server.

At block S305, the bank system sends to the server the information of the company which passes the verification, requests the company to sign a contract online, and thereby issues a credit to the company to authorize the company's access to the loan (e.g., a line of credit).

At block S306, the company pays back the loan through the bank system, which in turn sends the payment information of the company to the server. The server then either increases or decreases TrustPass index of the company according to the payment condition of the company.

Through exchanging information with the bank system, the server may obtain a report of the credit records of the company. The credit report has status information such as loan application of the company, loan examination, loan drawdown, and loan payment. The server increases the TrustPass index of a company which has successfully obtained a loan and made timely loan payments. If the server determines that the company did not pay the loan timely, the server may reduce the TrustPass index of the company and start a process of loss prevention and risk control.

The server may have already applied a mechanism of risk control since the company started to apply for a loan. The risk control mechanism may specifically include monitoring conditions such as loan application of the company and drawdown of the loan.

Figure 4:
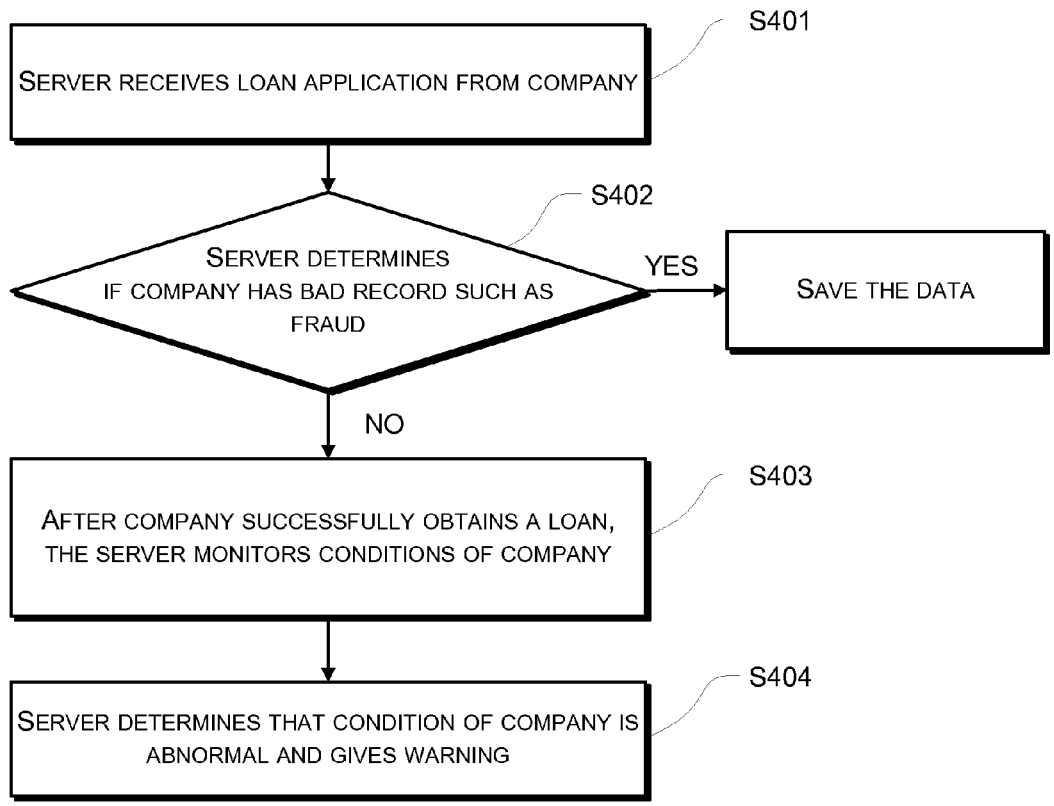
FIG. 4 shows a flow chart of an exemplary risk control process.

FIG. 4 shows a flow chart of an exemplary risk control process.

At block S401, a server receives a loan application from a company.

At block S402, the server obtains a historical record of the company from the server's own storage content and determines if the company has any bad record such as committing a fraud. If no bad record is found, the server sends the information of the company to a bank system. If the company has a bad record, the requirements for application are not satisfied. The server will store the data of the company so that the information can be reuse later when the company will satisfy the requirements.

At block S403, after the company successfully obtains a loan, the server monitors the conditions of the company.

At block S404, the server determines that the condition of the company is abnormal and gives a warning.

The conditions of the company may specifically include the following examples: daily activities, related operations of loan transaction, reciprocal ratings among members, related transaction rating, complaint information, status of the loan process, status of the service term with TrustPass and related offline information imported by the server and the bank system. If any of the above items has exceeded the average condition the company had prior to receiving the loan, or has otherwise become abnormal, the server will give a warning or an alert.

Figure 5:
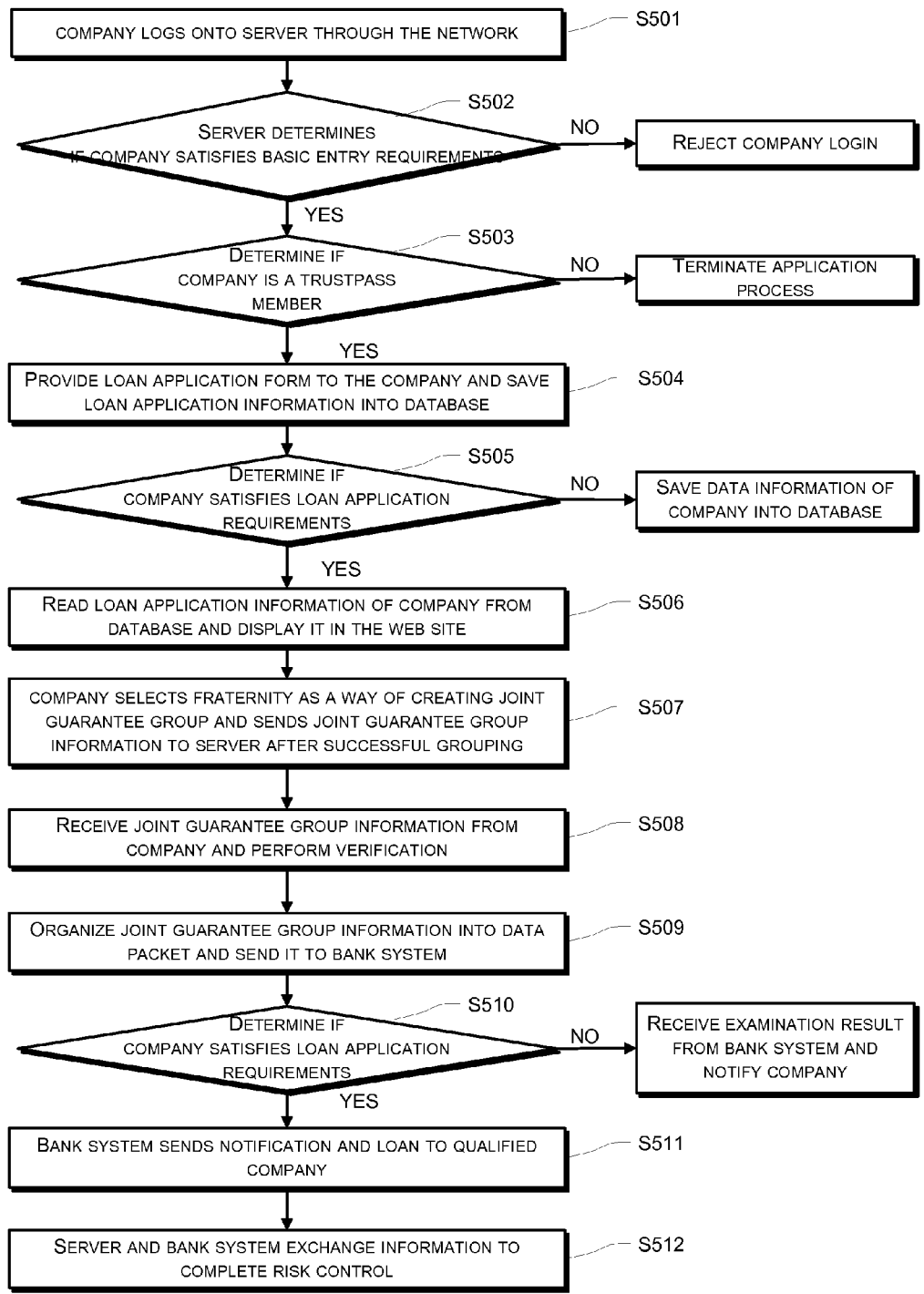
FIG. 5 shows a flow chart of a third exemplary method for processing online joint guarantee in accordance with the present invention.

FIG. 5 shows a flow chart of a third exemplary method for processing online joint guarantee in accordance with the present invention. The third exemplary embodiment uses fraternity as an exemplary type of joint guarantee grouping to illustrate a method for processing online joint guarantee.

Blocks S501 to S506 are collectively referred to as a grouping process and are the same grouping process described in blocks S201 to S206 of the second exemplary embodiment. Therefore, these blocks are not described here again.

At block S507, the company selects fraternity as a means for creating joint guarantee group, and sends the information of the joint guarantee group to the server after successful grouping.

A fraternity is made up of mutually recognized, acquainted or trusted companies. In an exemplary of using fraternity for joint guarantee grouping, multiple originally mutually recognized companies agree to initiate a joint guarantee group and let one company of the fraternity complete a loan application form to set up a joint guarantee group on behalf of the fraternity. Other companies of the fraternity are added later. The members of the fraternity may start to apply for loans after the joint guarantee group based on the fraternity has been successfully set up. The joint guarantee group based on a fraternity is usually a private and undisclosed group.

Specifically, after the application of the initiating company is successful, the server determines if the company has selected fraternity as a means for joint guarantee grouping. If the company selected fraternity to form a joint guarantee group, the server will then determine if the company satisfies the requirements for creating joint guarantee group. The requirements for creating a joint guarantee group may be the same type as the basic entry requirements for login by the company, but of different levels. These requirements can be timely adjusted by the server. If the company satisfies the requirements for creating a joint guarantee group, the server will create a joint guarantee group for the company. The joint guarantee group has a unique ID. The initiating company which starts the grouping is called a manager. After the manager forms the group, it can add other companies of the fraternity into the joint guarantee group. If the company did not choose fraternity as the means of joint guarantee grouping, the server may perform other types of joint guarantee grouping.

The server creates a joint guarantee group having a unique joint guarantee group ID for the company, and binds member information of the company with the information of joint guarantee group. After creating the joint guarantee group, the company can search according to the requirements to add members, and invite other companies to join the joint guarantee group. As the company adds a new member, the server determines if the new member satisfies the loan requirement by searching information of the new member in the database.

In the grouping process, companies in the joint guarantee group can add other members. To be added as a member, a company is subjected to examination and approval by all members currently in the joint guarantee group. If one current member dissents, the addition of the new member is not allowed. Before the initiating company creating the joint guarantee group submits the joint guarantee group information, other companies can withdraw at any time.

At block S508, the server receives the joint guarantee group information from the company and performs verification.

Specifically, the server determines whether the members in the group satisfy the requirements for creating a joint guarantee group. Exemplary requirements for creating a joint guarantee group are: identities and number of the company members in the group, relevant industries, relationship among companies and related qualifications of the companies. These requirements can be timely adjusted by the server. If the grouping requirements are satisfied, the server will determine if all companies in the joint guarantee group are mutually accepting and agreeing with one another to bear risks jointly. If affirmative, grouping is successful and the process will continue to block S509. If one or more company in the joint guarantee group raises an objection, grouping fails and the server may need to find another match or choose a different way of grouping. The server notifies the initiating company of the determination result through a suitable connotation means such as in-site message, email, text message or web page.

If all companies in the joint guarantee group accept and agree with one another, grouping is successful. Companies with successful grouping may be prohibited from participating or creating another joint guarantee group. If one or more company in the joint guarantee group raises an objection, the grouping fails and the manager of the joint guarantee group is allowed to determine whether to remove the dissenting company and add another company or companies which satisfy the requirements. The process may continue until all companies in the group accept and agree with one another.

The operations in blocks S509 to S512 are the same as those in blocks S209 to S212 of the second exemplary embodiment of FIG. 2 and are not described here again.

Figure 6:
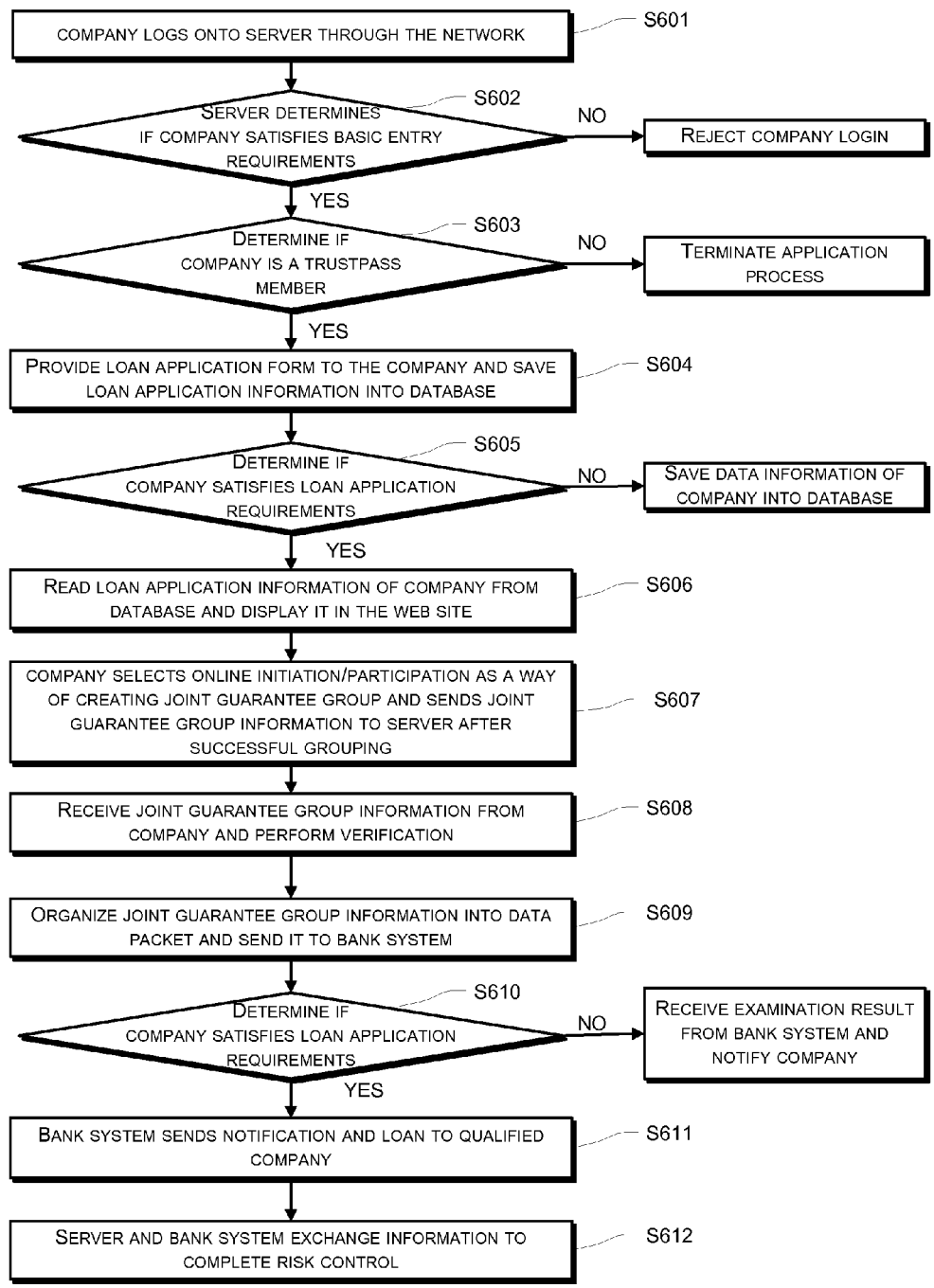
FIG. 6 shows a flow chart of a fourth exemplary method for processing online joint guarantee in accordance with the present invention.

FIG. 6 shows a flow chart of a fourth exemplary method for processing online joint guarantee in accordance with the present invention. The fourth exemplary embodiment uses online initiation/participation as an exemplary way of joint guarantee grouping to illustrate a method for processing online joint guarantee.

Blocks S601 to S606 make up a grouping process and are the same grouping process as described in blocks S201 to S206 of FIG. 2. These blocks are therefore not described here again.

At block S607, the company selects online initiation/participation as a way of joint guarantee grouping, and sends to the server information of the joint guarantee group after successful grouping.

In an exemplary online initiation/participation for joint guarantee grouping, a company announces a grouping request to the server, indicates the company's qualifications and grouping requirements, and then waits for or invites other qualified companies to join and form a group. The company that announces the grouping request using this approach may have a need for a loan but have temporarily failed to create a joint guarantee group through other ways. Another company, regardless of whether it has announced its own grouping requests, may apply to join a candidate joint guarantee group, provided that the company has not already joined another joint guarantee group and/or signed a joint guarantee agreement. For example, any company that has been unsuccessful with automatic matching and has not joined or is not qualified to join a fraternity may choose this option.

At block S608, the server receives the joint guarantee group information from the company and performs verification. The operations in blocks S608 to S612 are the same as those in blocks S209 to S212 of FIG. 2 and are not described here again.

The method of the present disclosure has been described above using several exemplary embodiments which use automatic matching, fraternity and online initiation/participation for joint guarantee grouping, respectively. Beside the embodiments described above, the method can also adopt other types of implementation. The following are some examples.

(1) Joint guarantee grouping by automatic matching plus online initiation

After an initiating company fills in the information for a loan application, the server can provide various types of joint guarantee grouping methods for the company to choose. If the company selects automatic matching plus online initiation, the server first announces the loan application information of the company, and then searches for other companies of similar requirements to the initiating company according to the settings of the company. The companies may either be currently online, or offline. The server automatically matches the companies to create joint guarantee groups according to different categories and characteristics.

(2) Joint guarantee grouping by automatic matching plus online participation

For those companies that do not want to disclose their loan application information and initiate a joint guarantee group, the server may automatically help match them with other online or off-line companies of similar loan demands and automatically form joint guarantee groups according to different categories and characteristics.

(3) Joint guarantee grouping by automatic matching plus temporary vacancy

When a candidate joint guarantee group has a member company kicked out due to a disagreement, it may have its requirements modified, and the server may automatically recommend other companies which satisfy the new requirements to the joint guarantee group.

(4) Joint guarantee grouping by automatic matching plus elimination from a group When a candidate joint guarantee group has a member company kicked out due to a disagreement, the server may automatically recommend other joint guarantee groups or companies to the company which has been kicked out of the group.

Figure 7:
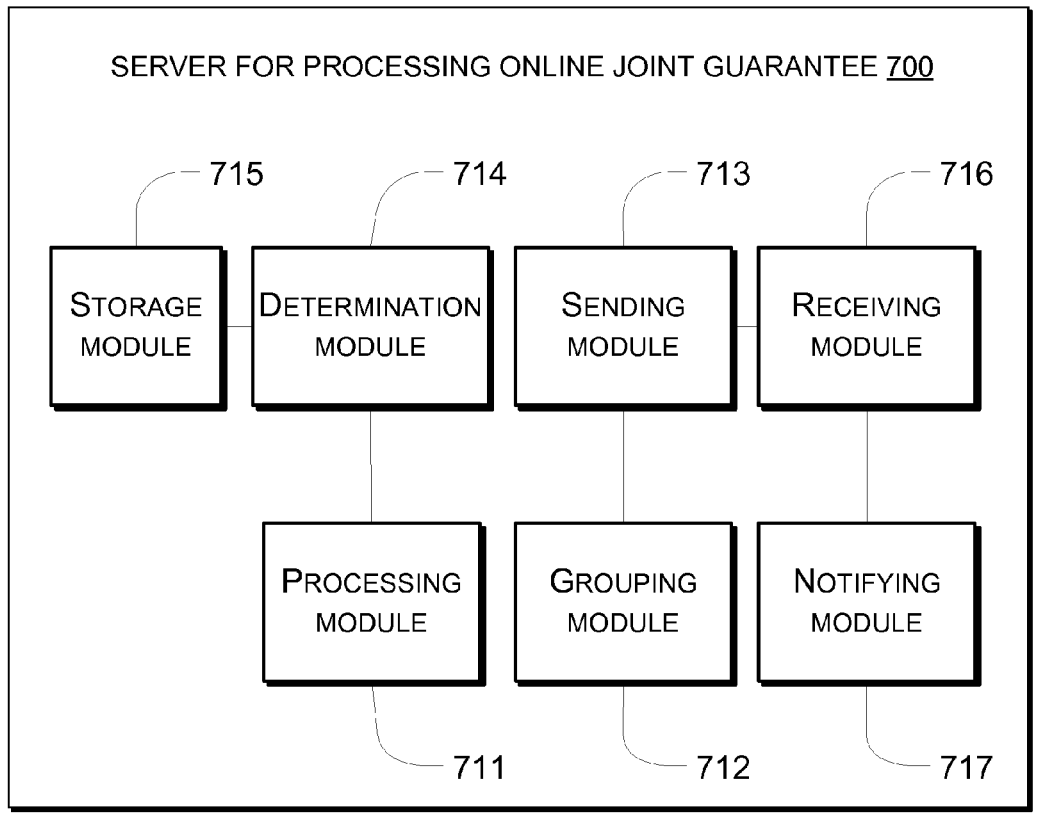
FIG. 7 shows a schematic diagram of a server for processing online joint guarantee in accordance with the present invention.

FIG. 7 shows a schematic diagram of a server for processing online joint guarantee in accordance with the present invention.

The server 700 has a processing module 711 adapted for receiving an application from a user, providing various user selectable types of joint guarantee grouping, and sending the user selection to a grouping module 712. The user selectable ways of forming a joint guarantee group include: automatic matching, fraternity, online initiation/participation, or a combination thereof. The grouping module 712 is adapted for creating a joint guarantee group having a unique ID according to the selection made by the user, and sending information of the joint guarantee group to a sending module 713. The sending module 713 is adapted for receiving the information of the joint guarantee group from the grouping module 712, organizing the information of the joint guarantee into a data packet and sending out the data packet.

In one embodiment, the server further has a determination module 714 adapted for receiving application information of the user and determining whether the user satisfies the requirements of the application. If yes, the determination module 714 sends the application information of the user to the processing module 711. Otherwise, the determination module 714 sends the application information of the user to a storage module 715. The storage module 715 is adapted for storing the application information of the user if the user does not satisfy the requirements of the application.

In another embodiment, the server further has a receiving module 716 adapted for receiving a message indicating whether the application of the user is approved, and sending the message to a notifying module 717. The notifying module 717 is adapted for sending to the user the message indicating whether the application of the user is approved.

Implementation Environment

At is noted that the disclosed method and system can be implemented using hardware only, but preferably should be implemented using a combination of software and hardware, such as a universal hardware platform. The disclosed method itself can be implemented in the form of software products stored in a storage media. The software includes instructions for a computer device (either stand-alone or networked) to execute the method described in the exemplary embodiments of the current disclosure.

In particular, the above-described techniques may be implemented with the help of a computing device, such as a server or a personal computer (PC) having a computing unit, as illustrated below.

Figure 8:
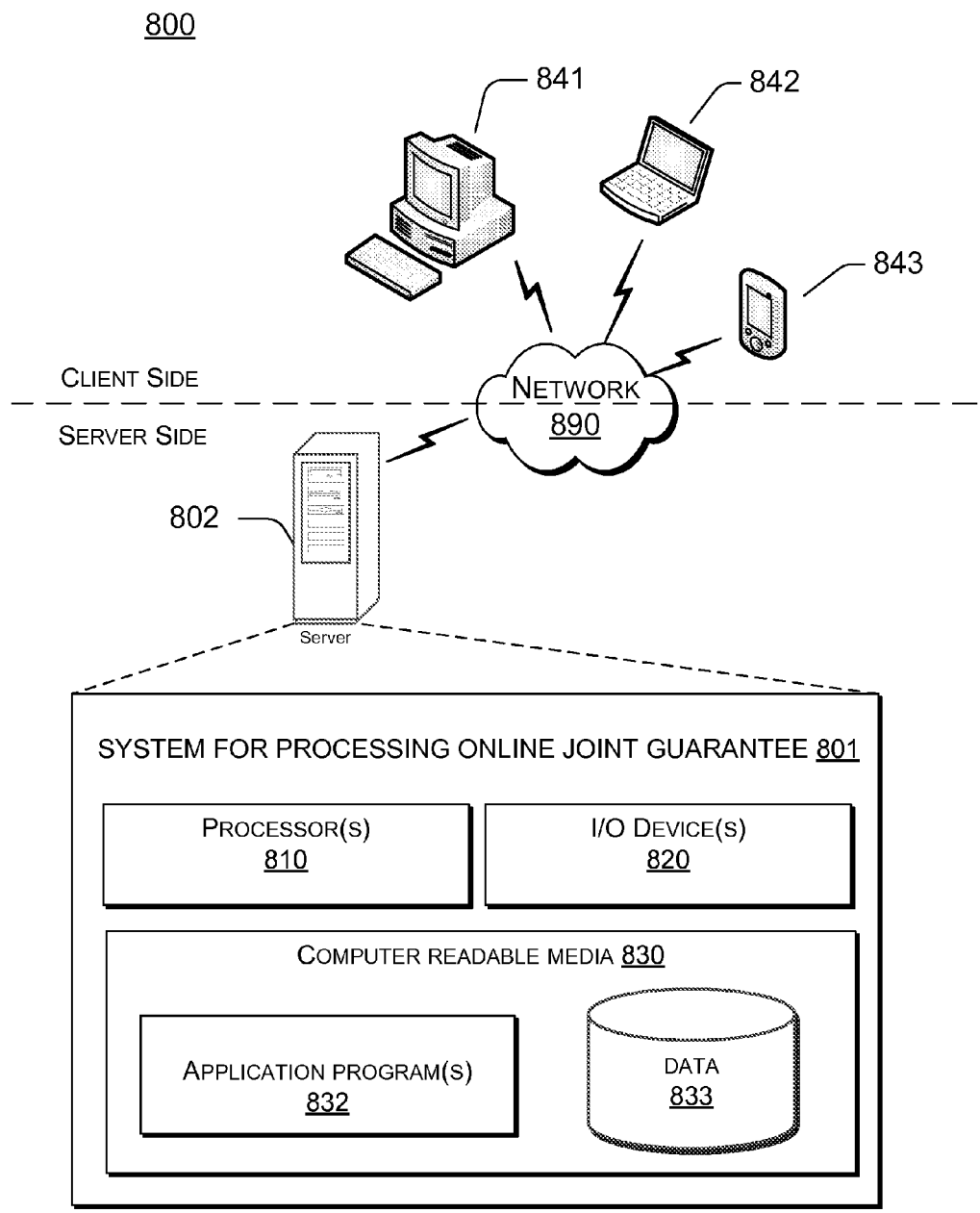
FIG. 8 shows an exemplary environment for implementing the method of the present disclosure.

FIG. 8 shows an exemplary environment for implementing the method of the present disclosure. In illustrated system 800, some components reside on a client side and other components reside on a server side. However, these components may reside in multiple other locations. Furthermore, two or more of the illustrated components may combine to form a single component at a single location.

System for processing online joint guarantee 801 is implemented with a computing device 802 which is preferably a server and includes processor(s) 810, I/O devices 820, computer readable media 830, and network interface (not shown). The computer device 802 is connected to client-side computing devices (client terminals) such as 841, 842 and 843 through network(s) 890. In one embodiment, computing device 802 is a server described herein (e.g., server 700), while client-side computing devices 841, 842 and 843 may each be a computer or a portable device, used as a user terminal.

The computer readable media 830 stores application program modules 832 and data 834 (such as application information, group information, loan records and messages). Application program modules 832 contain instructions which, when executed by processor(s) 810, cause the processor(s) 810 to perform actions of a process described herein (e.g., the illustrated process of FIG. 2). An exemplary process that can be performed by the system for processing online joint guarantee 801 by executing instructions stored in computer readable media 830 is as follows:

providing various user selectable types of joint guarantee grouping after the server receives from a user an application;

creating a joint guarantee group having a unique ID according to a selection made by the user; and organizing information of the joint guarantee group into a data packet and sending the data packet to a bank system.

It is appreciated that the computer readable media may be any of the suitable storage or memory devices for storing computer data. Such storage or memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. Especially, computer device 802 may be a server computer, or a cluster of such server computers, connected through network(s) 890, which may either be Internet or an intranet.

Using the method and the system provided in the above exemplary embodiments can potentially improve the success rate of joint guarantee grouping and remove the geographical limitations. This disclosure provides a possibility of grouping companies of different geographical locations through the Internet. The disclosed method is also capable to establish a complete online alert mechanism, and help to achieve computerized risk control of the loan process and improve the credit system of companies.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for processing online joint guarantee, the method comprising:
   receiving, from a device of a user, a loan application;
   enabling the user to select a joint guarantee grouping type for the loan application;
   creating, by a server, a joint guarantee group designated to the loan application based on a selection of the user, group members of the joint guarantee group guaranteeing timely payment of the loan;
   determining, by the server, an additional user as a member candidate of the group members of the joint guarantee group using data of historical activities of the additional user that are associated with joint guarantee grouping;
   assigning a unique identifier (ID) to the joint guarantee group; and
   transmitting the unique ID and information associated with the group members of the joint guarantee group to a banking system.

2. The method of claim 1, further comprising:
   determining by the server whether the user satisfies a predetermined requirement for applying for a loan; and
   in the event that the user does not satisfy the predetermined requirement, storing the user and the loan application.

3. The method of claim 1, further comprising:
   receiving, from the banking system, a notification indicating whether the banking system accepted the loan application; and
   transferring the notification to the device of the user.

4. The method of claim 1, further comprising:
   adding information associated with the user into the joint guarantee group as a group member; and
   determining by the server whether the user satisfies a predetermined requirement for being a member of the joint guarantee based on the added information associated with the user, wherein creating the joint guarantee group comprises creating the joint guarantee group after the user satisfies the predetermined requirement.

5. The method of claim 1, wherein the joint guarantee grouping type comprises at least one of an automatic matching-up grouping, a fraternity based grouping, or an online initiation/participation grouping.

6. The method of claim 1, wherein the joint guarantee group type comprises an automatic matching-up grouping that is implemented by:
   determining another user that is interested in the loan application;
   disclosing user information between the user and the other user; and
   recommending formation of the joint guarantee group including the user and the other users.

7. The method of claim 1, wherein the joint guarantee group type comprises a fraternity based grouping that is implemented by:
   receiving, from a plurality of users, one or more agreements indicating that the plurality of users agree to form one joint guarantee group; and
   adding another user of the plurality of users to the one joint guarantee group, wherein the creating the one joint guarantee group comprising creating the one joint guarantee group in response to a request of one user of the plurality of users.

8. The method of claim 1, wherein the joint guarantee group type comprises an online initiation/participation grouping that is implemented by:
   publishing a request of the user to form a certain joint guarantee group, the requesting indicating qualifications of the user and a grouping criterion; and
   creating the certain joint guarantee group based on the user and one or more qualified users.

9. One or more computer-readable storage devices storing computer-executable instructions that, when executed, perform acts comprising:
   receiving, from a user, a loan application;
   providing, by a server, various user selectable types of joint guarantee grouping for the loan application;
   determining whether the user satisfies a grouping requirement based on:
      a business record associated with the user, and
      activities of the user in joint guarantee grouping;

creating a joint guarantee group designated to the loan application based on a type of the various user selectable types if the user satisfies the grouping requirement;

assigning a unique ID to the joint guarantee group; and transmitting the unique ID and information of group members of the joint guarantee group to a banking system.

10. The one or more computer-readable storage devices as recited in claim 9, wherein the various user selectable types of joint guarantee grouping comprises at least one of an automatic matching-up grouping, a fraternity based grouping, or an online initiation/participation grouping.

11. One or more computer-readable storage devices storing computer-executable instructions that, when executed, perform acts comprising:

receiving, from a device of a first user, a loan application including information of the user and a loan specification;

determining, based on the information of the user, whether the user satisfies a predetermined requirement specified for loan applications;

in the event that the user does not satisfy the predetermined requirement:

recording the loan application; and in the event that the user satisfies the predetermined requirement:

creating a joint guarantee group designated to the loan application, determining, by a computing device, a second user as a candidate member of the joint guarantee group based on the information of the user and the loan specification, facilitating the second user to join the joint guarantee group, associating information of the user and the second user with the joint guarantee group to generate joint guarantee group data, and transmitting the joint guarantee group data to a banking system.

12. The one or more computer-readable storage devices as recited in claim 11, wherein the determining the second user comprises determining the second user based on a predetermined criterion specified by the user in the loan application, and wherein the facilitating the second user to join the joint guarantee group comprises:

enabling information sharing between the user and the second user, and receiving, from the second user, a request to join the joint guarantee group.

13. The one or more computer-readable storage devices as recited in claim 11, wherein the determining the second user comprises determining the second user based on historical activities of the second user, the historical activities being associated with joint guarantee grouping.

14. The one or more computer-readable storage devices as recited in claim 11, wherein the determining the second user comprises determining the second user based on:

a region that the first user is located;

a type of transactions that the user is involved, and funds requested in the loan application.

15. The one or more computer-readable storage devices as recited in claim 11, wherein the acts further comprise:

publishing the loan application;

receiving, from a certain user, a request to join the joint guarantee group; and transmitting information associated with the certain user to the device of the user.

16. The one or more computer-readable storage devices as recited in claim 11, wherein the predetermined requirement specifies at least one of:

a number of loan complaints against the user; or a time period that the user has established for a business.

17. The one or more computer-readable storage devices as recited in claim 11, wherein the joint guarantee group is comprised of a group of members that includes at least the first user and the second user, and wherein the acts further comprise:

enabling the user to search for a particular user based on a predetermined condition;

generating an invitation to invite the particular user to join the joint guarantee group; and adding the particular user to the joint guarantee group after each member of the group members of the joint guarantee group agree with the adding.

18. The one or more computer-readable storage devices as recited in claim 11, wherein the acts further comprise:

receiving, from a group member of the joint guarantee group, a withdrawal from the joint guarantee group; and removing the group member from the joint guarantee group before receiving an indication that the banking system approve the loan application.

19. The one or more computer-readable storage devices as recited in claim 18, wherein the acts further comprise recommending a certain user for the joint guarantee group based on user information associated with the removed group member.

* * * * *